(12) United States Patent
Kanematsu et al.

(10) Patent No.: US 6,183,055 B1  
(45) Date of Patent: *Feb. 6, 2001

(54) MULTI-PASS RECORDING SYSTEM USING RANDOM MASK

(75) Inventors: Daigoro Kanematsu, Kawasaki; Yoshinori Nakajima, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/995,894

(22) Filed: Dec. 22, 1997

(30) Foreign Application Priority Data

Dec. 25, 1996 (JP) .................................................. 8-346309  
Nov. 14, 1997 (JP) .................................................. 9-313448

(51) Int. Cl.$^7$ ............................... B41J 29/38; B41J 2/205  
(52) U.S. Cl. ....................................... 347/9; 347/15  
(58) Field of Search .................... 347/9, 15, 41; 358/1–9, 455

(56) References Cited

U.S. PATENT DOCUMENTS

| | | |
|---|---|---|
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,394,250 | * 2/1995 | Shono ................................. 358/455 |
| 5,818,474 | * 10/1998 | Takahashi et al. ..................... 347/15 |

FOREIGN PATENT DOCUMENTS

| | | |
|---|---|---|
| 0 567 288 | 10/1993 | (EP) . |
| 0 632 405 | 1/1995 | (EP) . |
| 0 718 105 | 6/1996 | (EP) . |
| 0 738 068 | 10/1996 | (EP) . |
| 0 745 484 | 12/1996 | (EP) . |
| 54-056847 | 5/1979 | (JP) . |
| 59-123670 | 7/1984 | (JP) . |
| 59-138461 | 8/1984 | (JP) . |
| 60-071260 | 4/1985 | (JP) . |
| 7-052390 | 2/1995 | (JP) . |

\* cited by examiner

*Primary Examiner*—Thinh Nguyen  
(74) *Attorney, Agent, or Firm*—Fitzpatrick, Cella, Harper & Scinto

(57) ABSTRACT

Multi-pass recording is performed to record an input image by plural scans of a recording head over a recording medium in a main scan direction with at least one interposed sub-scan. A thinned image is provided in each scan. Recording data for the input image is produced by creating mask patterns having a resolution lower than the recording resolution in the main scan direction and/or the interposed sub-scan direction on the basis of a random number array. The created mask patterns or enlarged forms of the created mask patterns are combined with input image data to produce the thinned images. A logical AND of the mask patterns and the input image data may be computed for use as recording data.

24 Claims, 12 Drawing Sheets

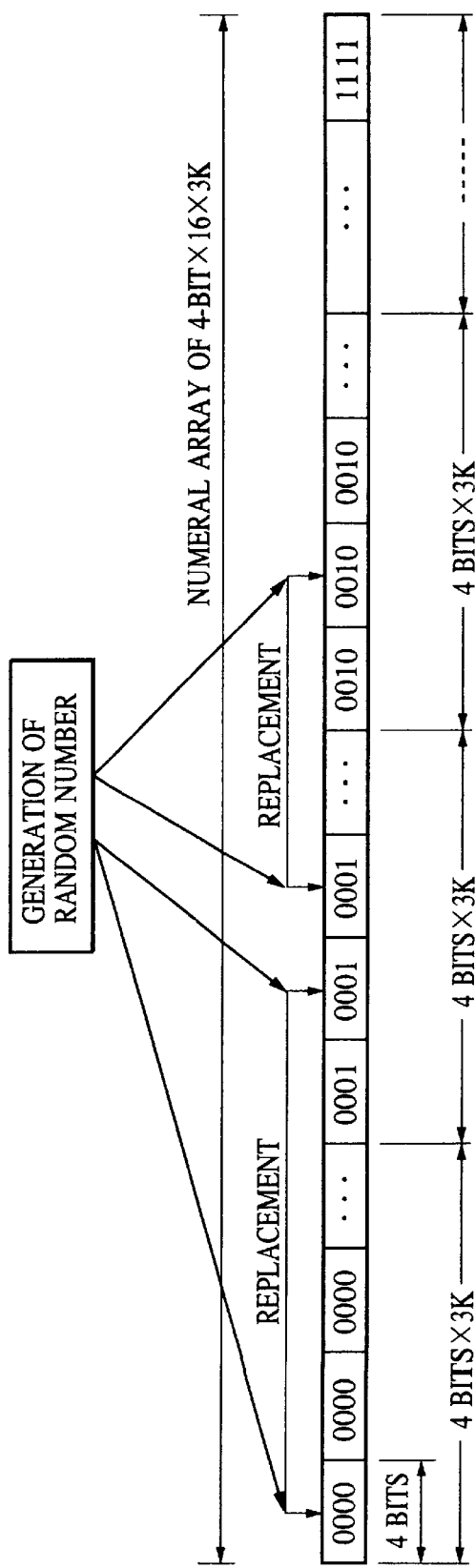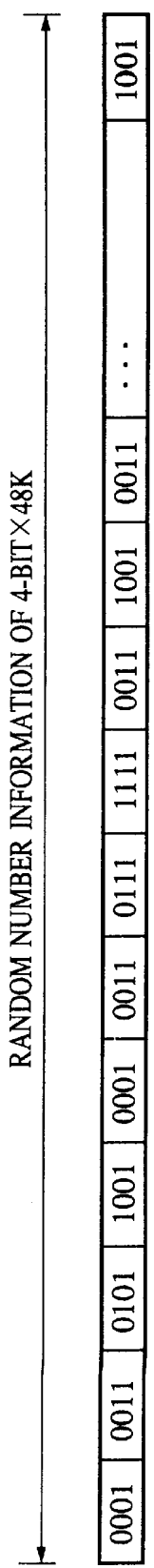

RANDOM NUMBER INFORMATION OF 4-BIT×48K

| RESIDUAL PASS OF BIT = 1 | |
|---|---|
| 0 | 1ST PASS AND 2ND PASS |
| 1 | 1ST PASS AND 3RD PASS |
| 2 | 1ST PASS AND 4TH PASS |
| 3 | 2ND PASS AND 3RD PASS |
| 4 | 2ND PASS AND 4TH PASS |
| 5 | 3RD PASS AND 4TH PASS |

| 0 | 1ST PASS |
|---|---|
| 1 | 2ND PASS |
| 2 | 3RD PASS |
| 3 | 4TH PASS |

MAIN SCAN DIRECTION →

SUB-SCAN DIRECTION ↓

MASK FOR 1ST PASS
| 1 | 1 | 1 |
| 1 | 1 | 1 |

MASK FOR 2ND PASS
| 0 | 0 | 1 | 1 |
| 1 | 1 | 0 | 0 |

MASK FOR 3RD PASS
| 0 | 0 | 0 |
| 0 | 0 | 0 |

MASK FOR 4TH PASS
| 0 | 0 | 0 | 0 |
| 0 | 0 | 0 | 0 |

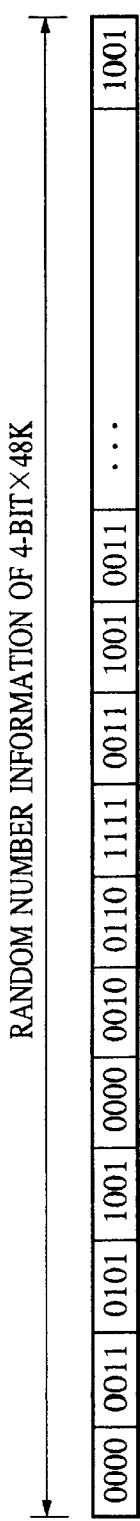
FIG. 11A  RANDOM NUMBER INFORMATION OF 4-BIT×48K
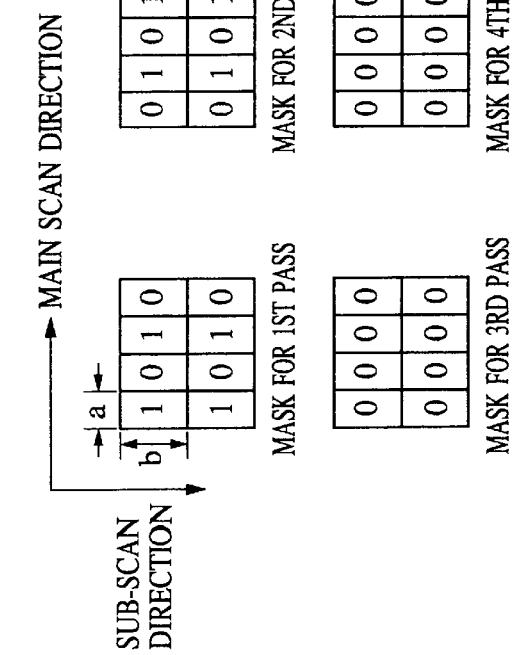
FIG. 11B
| RESIDUAL | |
|---|---|
| 0 | 1ST PASS (ODD COLUMN) AND 2ND PASS (EVEN COLUMN) |
| 1 | 1ST PASS (ODD COLUMN) AND 4TH PASS (EVEN COLUMN) |
| 2 | 3RD PASS (ODD COLUMN) AND 2ND PASS (EVEN COLUMN) |
| 3 | 3RD PASS (ODD COLUMN) AND 4TH PASS (EVEN COLUMN) |
a : SIZE OF 1 PIXEL AT 1200 DPI
b : SIZE OF 1 PIXEL AT 600 DPI
FIG. 11C

FIG. 12A

MAIN SCAN DIRECTION →

SUB-SCAN DIRECTION ↓

| 1 | 0 | 0 | 1 | 1 | 0 | 0 | 1 |
|---|---|---|---|---|---|---|---|
| 0 | 0 | 1 | 1 | 0 | 0 | 1 | 1 |
| 1 | 0 | 0 | 1 | 1 | 0 | 0 | 1 |
| 0 | 0 | 1 | 1 | 0 | 0 | 1 | 1 |
| 1 | 0 | 0 | 1 | 1 | 0 | 0 | 1 |
| 0 | 0 | 1 | 1 | 0 | 0 | 1 | 1 |
| 1 | 0 | 0 | 1 | 1 | 0 | 0 | 1 |
| 0 | 0 | 1 | 1 | 0 | 0 | 1 | 1 |

FIG. 12B

MAIN SCAN DIRECTION →

SUB-SCAN DIRECTION ↓

| 0 | 1 | 1 | 0 | 0 | 1 | 1 | 0 |
|---|---|---|---|---|---|---|---|
| 1 | 1 | 0 | 0 | 1 | 1 | 0 | 0 |
| 0 | 1 | 1 | 0 | 0 | 1 | 1 | 0 |
| 1 | 1 | 0 | 0 | 1 | 1 | 0 | 0 |
| 0 | 1 | 1 | 0 | 0 | 1 | 1 | 0 |
| 1 | 1 | 0 | 0 | 1 | 1 | 0 | 0 |
| 0 | 1 | 1 | 0 | 0 | 1 | 1 | 0 |
| 1 | 1 | 0 | 0 | 1 | 1 | 0 | 0 |

MULTI-PASS RECORDING SYSTEM USING RANDOM MASK

BACKGROUND OF THE INVENTION

1. Field of the Invention

The present invention relates to a recording apparatus and a recording control method, and more particularly to a recording apparatus and a recording control method wherein ink droplets are ejected onto a recording medium by using an ink jet recording head, for example, to record an image in accordance with the multi-pass recording technique.

2. Description of the Related Art

As color recording techniques, there are known at the present, for example, the thermal transfer type in which recording is performed by transferring ink on an ink ribbon to a recording medium, e.g., a sheet of recording paper, with thermal energy, the ink jet recording type in which recording is performed by ejecting ink droplets to be deposited on a recording medium. Above all, attention is focused on the ink jet recording type because it is based on the non-impact recording technique generating no noise during the recording operation, permits high-speed recording, and enables an image to be recorded on plain paper without a need for a special fixing process.

In a serial printer wherein an image is completed by reciprocally scanning a recording head, which employs the above-stated ink jet recording technique, plural times while ink is ejected from the recording head toward a recording medium, e.g., a sheet of recording paper, the accuracy of feed of the recording medium and the ejection ability of the recording head may adversely affect recording quality. For example, unevenness in density of a recorded image may result from poor accuracy in feed of the recording medium, and undesirable streaks, that is, banding may result from variations in ejecting operation of the recording head.

To solve the above drawback, there has been proposed a multi-pass recording technique wherein the same area of a recording medium is scanned multiple times by different portions of a recording head to completely record an image in that area of the recording medium. Specifically, in such a multi-pass recording technique, a mask matrix of predetermined size is applied to original image data to compute a logical AND of the two for thinning the number of pixels (picture elements) to be recorded per scan, and ink is ejected from different nozzles of the recording head for each scan. In addition, the distance over which the recording medium is fed per unit time is set in the recording operation to be shorter than the recording width of the recording head. This holds down unevenness in density and undesirable streaks which would otherwise be caused by the fact that variations in ejecting ability between the nozzles of the recording head are concentrated on a particular portion of the recording medium, as well as by poor accuracy in feed of the recording medium.

FIGS. 12A and 12B show examples of a mask matrix of 8 dots×8 dots for use in a recording technique (2-pass recording) with which image recording is completed by scanning the same area of a recording material two times by different portions of a recording head. FIG. 12A represents a pattern of the mask matrix (hereinafter referred to as "MASK 1") used for the first scan (first pass), and FIG. 12B represents a pattern of the mask matrix (hereinafter referred to as "MASK 2") used for the second scan (second pass). In each of the MASKs, a pattern of 4 bits×4 bits shown surrounded by wide lines is repeated.

Assuming, for example, that the number of nozzles of the recording head is 256 and the nozzles are arrayed in a line in the direction of feed of the recording medium, multi-pass recording using the mask matrixes shown in FIGS. 12A and 12B is performed under recording control described below.

Initially, in a first-pass recording cycle, the logical AND of original image data corresponding to the 256 nozzles and the MASK 1 is computed and upper-half data of the computed result is output, as data for the first pass, to the 128 nozzles in the lower half of the recording head. As a consequence, the recording is made by using the lower-half 128 ones of the total 256 nozzles of the recording head.

Then, the recording medium is fed through a distance corresponding to the recording width covered by a half, i.e., 128 nozzles, of the total 256 nozzles of the recording head. Subsequently, the logical AND of the original image data corresponding to the 256 nozzles and the MASK 2 is computed and the computed result is output, as data for the second pass, to the recording head. As a consequence, the recording is made in the recording width corresponding to the total 256 nozzles by using the image data masked by the MASK 2. The recording of the first pass and the recording of the second pass are thus superposed in the upper half of the total recording width of the recording head.

Further, the recording medium is fed again through a distance corresponding to the recording width covered by a half, i.e., 128 nozzles, of the total 256 nozzles of the recording head. Subsequently, the computed result for the lower-half 128 nozzles obtained from the above-stated logical AND operation between the original image data corresponding to the first set of 256 nozzles and the MASK 1 and the computed result of the logical AND operation between those of the original image data corresponding to the next set of 256 nozzles, which are associated with the lower-half 128 nozzles thereof, and the MASK 1 are output, as data for the third pass, to the 256 nozzles of the recording head. As a consequence, a half of the image corresponding to the original image data for the first set of 256 nozzles, which results from masking it by the MASK 1 and using the upper-half 128 nozzles of the recording head, and a half of the image corresponding to the original image data for the next set of 256 nozzles, which results from masking it by the MASK 1 and using the lower-half 128 nozzles of the recording head, are both recorded. The recording of the second pass and the recording of the third pass are thus superposed in the upper half of the total recording width of the recording head.

Through the above process, the recording of the image with a recording width corresponding to the 256 nozzles of the recording head is completed.

Meanwhile, when the mask matrices shown in FIGS. 12A and 12B are used, the same nozzles are employed at the same timing at a 4-dot period in both the main scan direction in which the recording head is moved and the sub-scan direction in which the recording medium is fed. Suppose now that a printer has resolution of 300 (in the main scan direction)×300 (in the sub-scan direction) DPI and an A4-size sheet of recording paper is used as the recording medium with its long side extending in the sub-scan direction, the same nozzles are employed at the same timing repeatedly (2480÷4) times because the number of recording dots in the main scan direction is about 2480 dots. Accordingly, variations in ability of the nozzles are repeated at the 4-dot period, which makes it difficult to perfectly eliminate unevenness in density and undesirable streaks. In addition, because the mask pattern is fixed, the effect of the multi-pass recording is not obtained if recording data is synchronized with the mask pattern.

To solve the above problem, in Japanese Patent Laid-Open No. 7-52390 (U.S. patent application Ser. No. 266,498), the inventors proposed a method of using a mask matrix with a mask pattern distributed at random in an area of predetermined size (e.g., 2400×8 dots). In the proposed method of using such a mask (random mask), random values in predetermined number of bits are stored in a ROM beforehand, and the random values are read out of the ROM depending on the number of recording passes to create a pattern of each random mask on a RAM. Using the random mask makes the period of ink ejection irregular in both the main scan/sub-scan directions, and hence contributes to preventing unevenness in density and undesirable streaks. In addition, since the mask pattern is random, the possibility that recording data may synchronize with the mask pattern is very low.

The inventors however found that even the above-proposed recording method on the basis of the multi-pass recording technique using the random mask raises a problem described below for a printer having recording resolution as high as 1200×600 DPI, for example.

Specifically, the positions where ink droplets ejected from the recording head are deposited on the recording medium are shifted in units of each pixel of 1200×600 DPI corresponding to the mask resolution, and the shift appears on a recorded image as unevenness in density with high spatial frequency which is easily recognized by human eyes. Elimination of such unevenness in density requires not only highly accurate mechanical control relating to the movement of the recording head and the feed of the recording medium in both the main scan/sub-scan directions, but also high standards in ejection ability of the recording head as well. But there are limits to improving the accuracy of the mechanical control and the ejection ability of the recording head. Even if an improvement is realized to some extent in those points, the technique permitting such an improvement necessarily pushes up cost of the entire recording apparatus.

SUMMARY OF THE INVENTION

With a view of solving the above-mentioned problems in the art, it is an object of the present invention to provide a recording apparatus and a recording control method by which an image can be recorded with high quality and high resolution free from unevenness in density, undesirable streaks and conspicuous texture.

To achieve the above object, according to one aspect of the present invention, there is provided a recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on the recording medium. The apparatus includes a random number generating unit for generating a random number, a mask creating unit for creating, based on the random number generated by the random number generating unit, mask patterns each having resolution lower than the recording resolution in at least one of the main scan direction and the sub-scan direction corresponding to the plural main scans, and a thinning unit for producing the thinned images to be recorded in the plural main scans by using the mask patterns created by the mask creating unit.

According to one aspect of the present invention, there is provided a recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on the recording medium. The apparatus includes a random number generating unit for generating a random number, a mask creating unit for creating mask patterns each having resolution equal to the recording resolution based on the random number generated by the random number generating unit, a mask enlarging unit for enlarging each of the mask patterns created by the mask creating unit in at least one of the main scan direction and the sub-scan direction, and a thinning unit for producing the thinned images by using the mask patterns enlarged by the mask enlarging unit.

According to another aspect of the present invention, there is provided a recording method by which a recording head having a plurality of recording elements is main-scanned plural times, with at least one sub-scan interposed between the main scans, over a predetermined area of a recording medium to record a thinned image for each scan in a complementary manner, thereby forming a whole image on the recording medium. The method includes the steps of generating a random number, creating, based on the generated random number, mask patterns each having a resolution lower than the recording resolution in at least one of the main scan direction and the sub-scan direction corresponding to the plural main scans, and producing the thinned images to be recorded in the plural main scans by using the created mask patterns.

According to still another aspect of the present invention, there is provided a data supply method for supplying image data to a recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on the recording medium. The method includes the steps of generating a random number, creating, based on the generated random number, mask patterns each having a resolution lower than the recording resolution in at least one of the main scan direction and the sub-scan direction corresponding to the plural main scans, and producing the thinned images to be recorded in the plural main scans by using the created mask patterns.

According to still another aspect of the present invention, there is provided a recording method by which a recording head having a plurality of recording elements is main-scanned plural times, with at least one sub-scan interposed between the main scans, over a predetermined area of a recording medium to record a thinned image for each scan in a complementary manner, thereby forming a whole image on the recording medium. The method includes the steps of generating a random number, creating mask patterns each having a resolution equal to the recording resolution based on the generated random number, enlarging each of the created mask patterns in at least one of the main scan direction and the sub-scan direction, and producing the thinned images by using the enlarged mask patterns.

According to still another aspect of the present invention, there is provided a data supply method for supplying image data to a recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on the recording medium. The method includes the steps of generating a random number, creating mask patterns each having a resolution equal to the recording resolution based on the generated random number, enlarging each of the created mask patterns in at least one of the main scan direction and the sub-scan direction, and producing the thinned images by using the enlarged mask patterns.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 4A and 4B are representations for explaining a method of generating a random number.

FIGS. 11A to 11C are representations for explaining a method of creating random masks according to a third example.

FIGS. 12A and 12B are representations showing examples/of a mask matrix of 8 dots×8 dots for use in a recording technique (2-pass recording) with which image recording is completed by scanning the same area of a recording material two times by different portions of a recording head.

DETAILED DESCRIPTION OF THE PREFERRED EMBODIMENTS

Preferred embodiments of the present invention will be described hereunder in detail with reference to the accompanying drawings.

In the following description, a color recording apparatus provided with a recording head to carry out color recording based on the ink jet recording technique is taken as a typical embodiment of the present invention.

Prior to explaining several practical embodiments, the construction of an apparatus used in common to those embodiments will be first explained.

(1) Explanation of Outline of Apparatus

Figure 1:
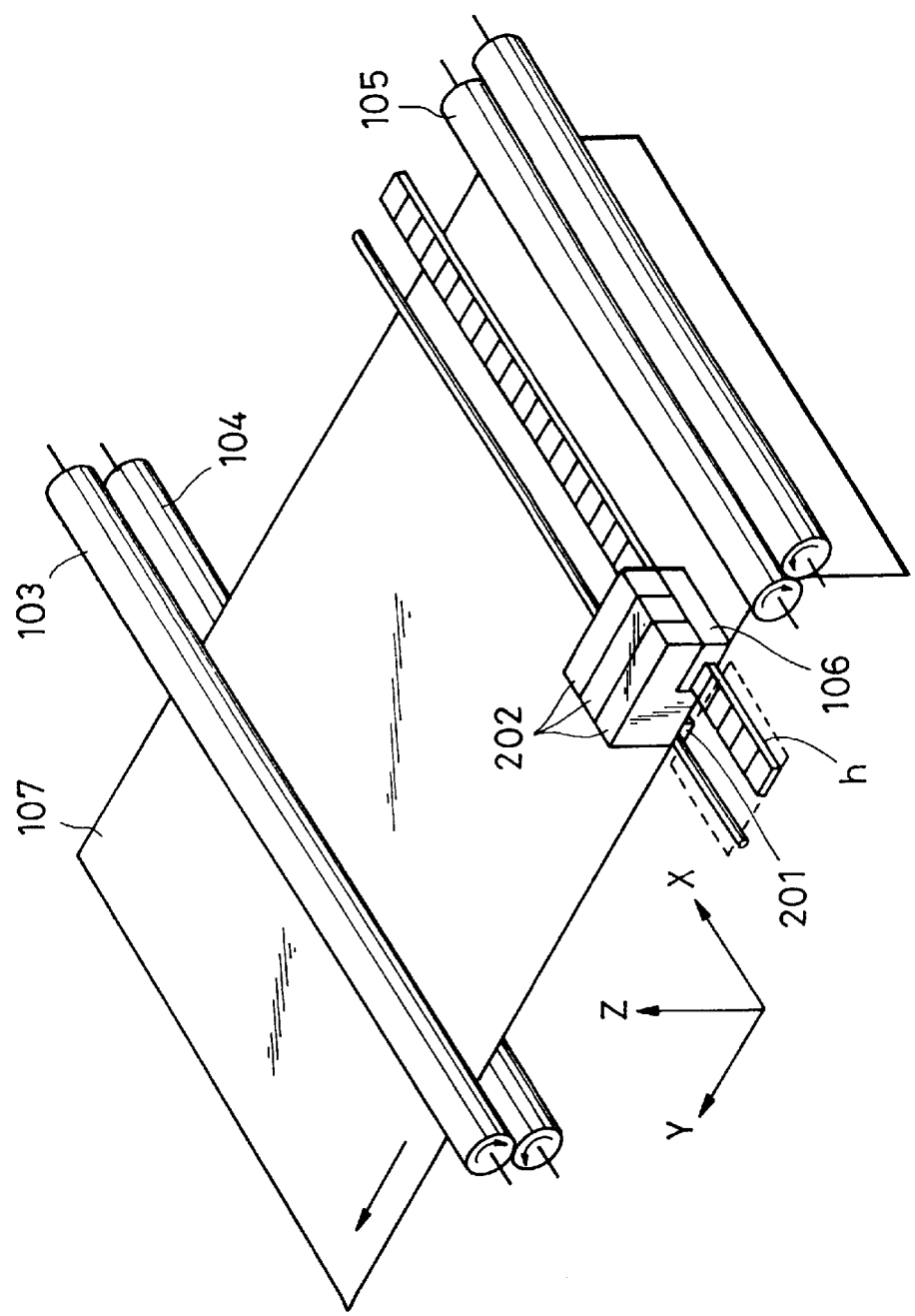
FIG. 1 is a perspective view showing the schematic construction of a color recording apparatus for recording an image based on a multi-pass recording technique, the apparatus representing a typical embodiment of the present invention.

FIG. 1 is a perspective view schematically showing a construction of a color recording apparatus (hereinafter referred to a recording apparatus) for recording an image based on a multi-pass recording technique, the apparatus representing the typical embodiment of the present invention.

In FIG. 1, denoted by reference numeral 201 is a recording head for recording an image based on the ink jet recording technique, and 202 is an ink tank containing ink in four colors (black (K), cyan (C), magenta (M) and yellow (Y)) separately. The recording head 201 includes four groups of nozzles corresponding to the four colors of ink for ejecting the ink in different colors. In the illustrated embodiment, the recording head 201 and the ink tank 202 are integrally constructed into a one-piece ink cartridge.

A paper feed roller 103 rotates in the direction of arrow in FIG. 1 and cooperates with an auxiliary roller 104 to feed a sheet of recording paper 107 while retaining it in place. A roller 105 rotates so as to pull the sheet of recording paper 107 in a direction opposed to the direction of feed of the sheet of recording paper 107 by a force weaker than the rotating force of the paper feed roller 103 so that the sheet of recording paper 107 is always kept in a stretched state. A carriage 106 for mounting the ink cartridge is reciprocally moved in the direction of an x-axis (i.e., in the main scan direction). When the recording apparatus is not performing the recording operation, or when it is in a mode to perform the operation of restoring the recording head, the carriage 106 is controlled to stand by in a home position indicated by dot lines in FIG. 1.

When the carriage 106 held in the home position prior to the start of the recording operation receives a recording start command from a host (not shown in FIG. 1), it drives recording elements provided on the recording head 201 to perform recording over an area of the sheet of recording paper 107 corresponding to the recording width of the recording head 201, while moving in the direction of the x-axis. When the carriage 106 completes the recording in the main scan direction at the opposite side end of the sheet of recording paper, it returns to the home position and starts the recording again in the direction of the x-axis. In a period from the end of the previous cycle of recording scan to the start of the next cycle of recording scan, the paper feed roller 103 is rotated in the direction of the arrow in FIG. 1 to feed the sheet of recording paper 107 through a required distance in the direction of a y-axis (i.e., in the sub-scan direction).

By repeating the carriage scan and the paper feed in such a way, recording of an image on the entire sheet of recording paper 107 is completed. The operation of ejecting the ink from the recording head 201 in the above recording process is carried out under control effected by a control circuit (described later) in accordance with the predetermined sequence of recording control.

To increase the recording speed, the above-explained construction of the recording apparatus may be modified such that, in the reciprocal movement of the carriage 106, the recording is made not only when the carriage 106 is moved in the direction away from the home position, but also when the carriage 106 is moved in the direction toward the home position.

Also, while the recording head 201 and the ink tank 202 are constructed in an integral ink cartridge in the foregoing embodiment, the recording head 201 and the ink tank 202 may be mounted on the carriage 106 separately from each other. Further, the recording head is not limited to the construction wherein the four groups of nozzles corresponding to the four colors of ink are arranged side by side in the main scan direction like the foregoing embodiment, but may be constructed such that the four groups of nozzles corresponding to the four colors of ink are arranged side by side in the sub-scan direction.

In the home position where the recording head is subjected to the restoring operation, there are provided a cap (not shown) for capping the front surface (ejection outlet (orifice) surface) of the recording head, and a restoring unit (not shown) for carrying out the head restoring operation such as removing the ink having increased viscosity and air bubbles in the recording head which is kept in the capped state. Also, a cleaning blade (not shown), etc. are provided laterally of the cap and supported in such a manner as able to project toward the recording head 201 and come into abutment with the front surface of the recording head. After the restoring operation, the cleaning blade is projected into a path along which the recording head moves, so that undesirable ink droplets, stains, etc. deposited on the front surface of the recording head are wiped out by the cleaning blade when the recording head moves and passes it.

(2) Explanation of Recording Head

Figure 2:
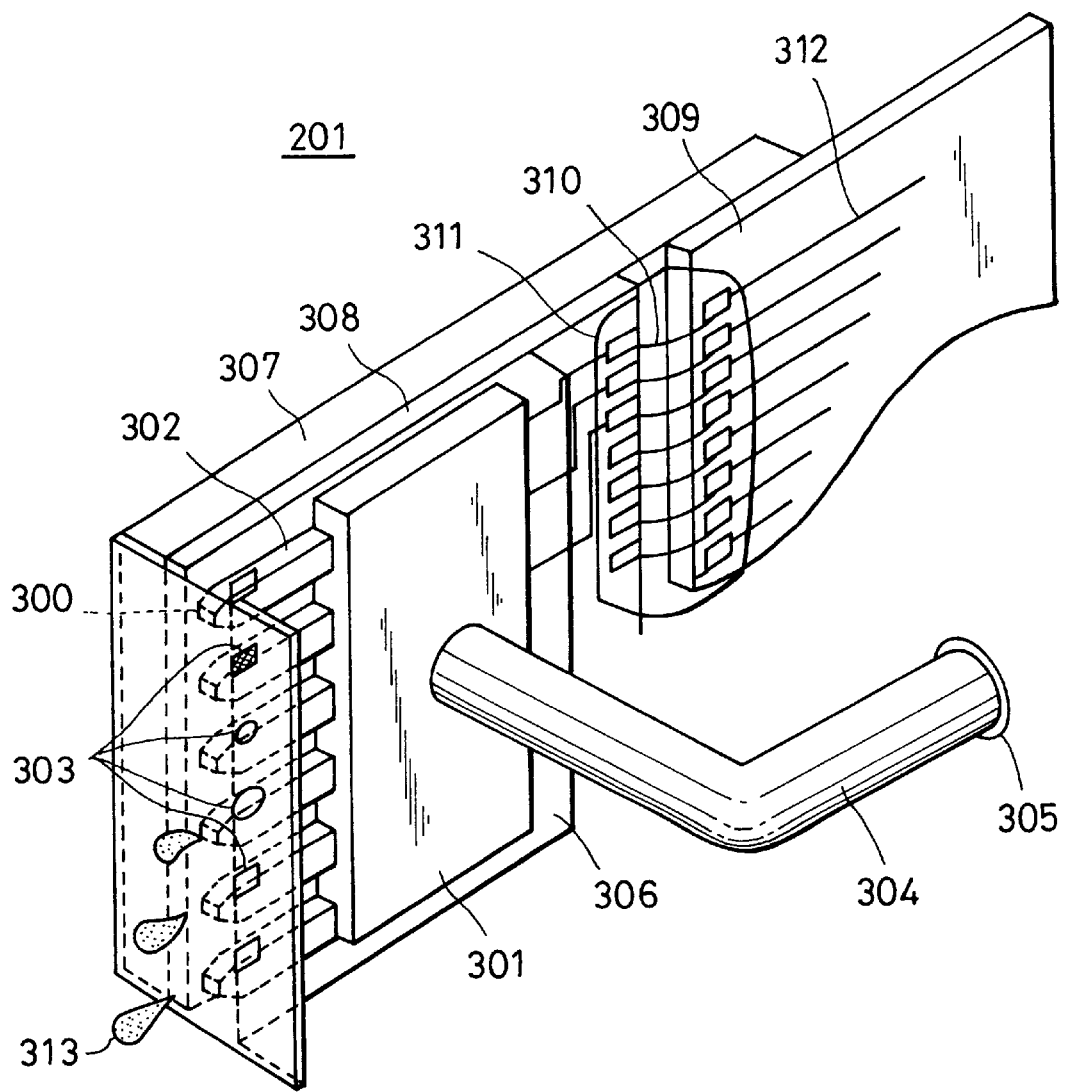
FIG. 2 is a perspective view showing the structure of a recording head shown in FIG. 1.

FIG. 2 is a perspective view showing the structure of the recording head 201 shown in FIG. 1.

As shown in FIG. 2, the recording head 201 includes a plurality of ejection outlets 300 formed therein at a predetermined pitch. Heat generating elements 303 for generating thermal energy to eject the ink are disposed along wall surfaces of respective liquid passages 302 connecting a common liquid chamber 301 and the ejection ports 300 to each other. The heat generating elements 303 and their associated circuits are formed on a silicon substrate utilizing the semiconductor manufacture technology. A silicon plate 308 on which is formed electric wiring for the heat generating elements 303 and their associated circuits is bonded to an aluminum base plate 307 for heating.

A circuit connecting portion 311 on the silicon plate 308 is connected to a printed board 309 through ultra-superfine wires 310, and the silicon plate 308 receives signals from the recording apparatus body through a signal circuit 312. The liquid passages 302 and the common liquid chamber 301 are formed by a plastic cover 306 which is fabricated by injection molding. The common liquid chamber 301 communicates with the ink tank 202 via a joint pipe 304 and an ink filter 305 so that the ink is supplied to the common liquid chamber 301 from the ink tank 202.

The ink supplied from the ink tank 202 is temporarily stored in the common liquid chamber 301 and then enters the liquid passages 302 based on a capillary phenomenon, thus establishing a state where the liquid passages 302 are filled with the ink forming a meniscus in each of the ejection ports 300. When the heat generating elements 303 are supplied with a current through electrodes (not shown) and generate heat in that state, the ink lying on the heat generating elements 303 is quickly heated to produce air bubbles in the liquid passages 302. With expansion of the air bubbles, ink droplets 313 are ejected from the ejection outlets 300.

(3) Explanation of Control Circuit

Figure 3:
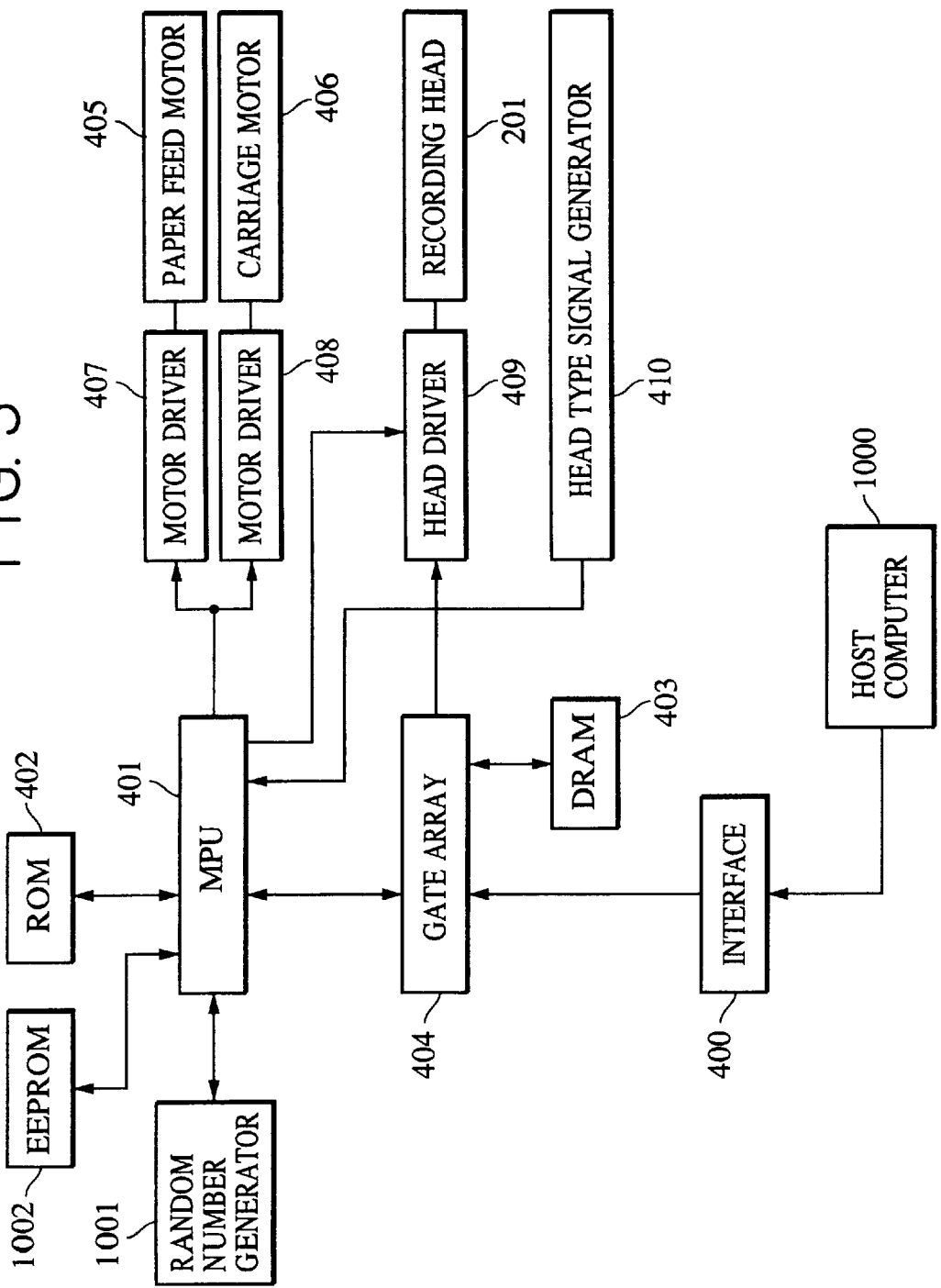
FIG. 3 is a block diagram showing the configuration of a control circuit for the recording apparatus.

FIG. 3 is a block diagram showing the configuration of a control circuit for the recording apparatus. As shown in FIG. 3, the control circuit includes an interface 400 for receiving image data with predetermined recording resolution from a host computer (hereinafter referred to as a host) 1000, an MPU 401, a ROM 402 for storing control programs executed by the MPU 401, and a DRAM 403 for storing various data (such as image data and recording signals supplied to the recording head), the DRAM 403 being able to store the number of recording dots, the number of replacement times of ink cartridges, etc. as well. Thus, the DRAM 403 serves also as a buffer for temporarily storing image data bitmapped by the MPU 401. The control circuit also includes a gate array (G.A.) 404 for controlling not only supply of the recording signals to the recording head 201, but also for transferring data among the interface 400, the MPU 401 and the DRAM 403. Denoted by 405 is a paper feed motor for feeding a sheet of recording paper. 406 is a carriage motor for moving the carriage 106. Further, 407, 408 are motor drivers for driving the paper feed motor 405 and the carriage motor 406, respectively, and 409 is a head driver for driving the recording head 201.

The control circuit further includes a head type signal generator 410 for informing, in accordance with the type of the ink cartridge or the recording head mounted to the carriage 106, the MPU 401 whether it is for color recording or monochromatic recording. The type of the ink cartridge or the recording head is determined from, e.g., a connection state between electrical contacts provided on the carriage 106 and electrical contacts provided on the ink cartridge or the recording head mounted to the carriage 106.

In addition, the control circuit includes a random number generator 1001 for generating a random number in accordance with an instruction from the MPU 401, and an EEPROM 1002 for storing a random number array in a predetermined number of bits generated by the random number generator 1001. The MPU 401 reads out the random number array stored in the EEPROM 1002, creates random masks corresponding to the number of recording passes, and executes a masking process for the image data stored in the DRAM 403 by using the random masks.

In the recording apparatus thus constructed, the recording head includes 256 nozzles with a density of 600 DPI for each color of ink, and carries out recording with resolution of 1200 DPI in the main scan direction and 600 DPI in the sub-scan direction. The random mask has resolution of 300 DPI in the main scan direction and 300 DPI in the sub-scan direction lower than the recording resolution.

Next, several practical embodiments will be described illustrating how to create the random mask and how the random mask is employed in the multi-pass recording process executed in the recording apparatus constructed as explained above.

Although the above recording apparatus is constructed as an apparatus capable of recording a color image, it is assumed for the simplicity of explanation that an image is recorded in a monochromatic tone or by using ink in one color.

First Embodiment

In this first embodiment, the number of passes of the recording head repeated for the same area of a sheet of recording paper in the multi-pass recording is assumed to be 4.

A method of generating a random number to be stored in the EEPROM 1002 will be first explained.

FIGS. 4A and 4B are representations for explaining the method of generating a random number.

Suppose here the multi-pass recording of 16 passes at maximum, as shown in FIG. 4A, values from 0 to 15 expressed by 4 bits (0000 (b: binary notation)–1111 (b)) are temporarily written in number 3K (=3×1024) for each of the values in the order increasing successively in a predetermined area of the DRAM 403. In this way, an initial numeral array of total 4-bit×48 K is loaded in the DRAM 403. The initial numeral array is stored in addresses "0000 (H: hexadecimal notation)" to "BFFF (H)" in units of 4-bit with a relative head address given by "0000 (H)". When any of the addresses is designated, a value of the 4 bits at that address is read out.

Subsequently, also as shown in FIG. 4A, arbitrary two values among 0 to 48K are generated from the MPU 401 by using the random number generator 1001 or a random number generating function. Then, the values stored in the relative addresses of the DRAM 403 corresponding to the two generated values are replaced with each other (shuffling). This shuffling process is repeated in predetermined number (here 200000 times). As a result of the shuffling, a random number array of 4-bit×48 K shown in FIG. 4B is produced. The produced random number array is stored in the EEPROM 1002.

A method of creating random masks will be explained below.

Figure 5A:
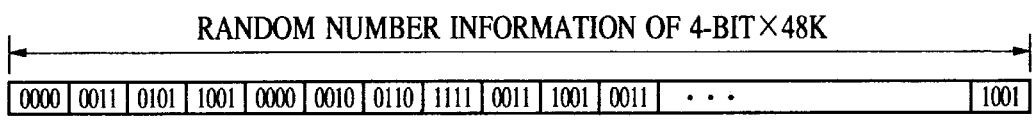
FIGS. 5A to 5D are representations for explaining a method of creating random masks according to a first example.
Figure 5B:
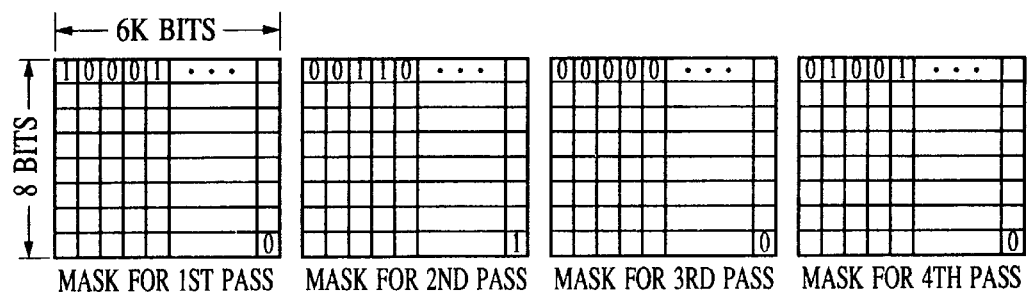

FIGS. 5A to 5D are representations for explaining the method of creating random masks. In the case where the random mask secured in the DRAM 403 has a memory size of 4-bit×48 K, i.e., 24 Kbytes, as shown in FIG. 5A, if the multi-pass recording is performed to complete image recording for the same recording area through four passes, the mask size for each of the four passes is given by 24÷4=6 Kbytes. Then, in this first example, the mask area for providing such a mask size is made up of 6 Kbits in the main scan direction and 8 bits in the sub-scan direction, as shown in FIG. 5B.

In a process of creating the random masks for the four passes, which one of the passes pixels are to be recorded in is determined for each of the pixels, and values of the bits for those pixels corresponding to the pass which they are determined to be recorded in are set to "1". More practically, -the random masks are created as follows.

First, the random number array of 4-bit×48 K, shown in FIG. 5A, is read out from the head in units of 4-bits. Then, the residual resulted from dividing the read-out value by 4 is determined. The residual is one of 0, 1, 2 and 3. If the residual is "0", the head bit of the random mask for use in recording of the first pass is set to "1". On the other hand, the head bits of the random masks for use in recording of the second to fourth passes are set to "0". If the residual is "1", the head bit of the random mask for use in recording of the second pass is set to "1", and the head bits of the random masks for use in recording of the other passes are set to "0". Likewise, if the residual is "2", the head bit of the random mask for use in recording of the third pass is set to "1", and the head bits of the random masks for use in recording of the other passes are set to "0". Further, if the residual is "3", the head bit of the random mask for use in recording of the fourth pass is set to "1", and the head bits of the random masks for use in recording of the other passes are set to "0".

Subsequently, the random number information of the next four bits is read out, and values of the next bits of the random masks for four passes are set in accordance with the residuals resulted from dividing the read-out value by 4. After that, all of the random number array of 4-bit×48 K is processed in units of 4-bits in like manner. As a result, the random masks for the four passes, each having a size of 6 Kbits×8 bits, are completed as shown in FIG. 5B.

Figure 5C:
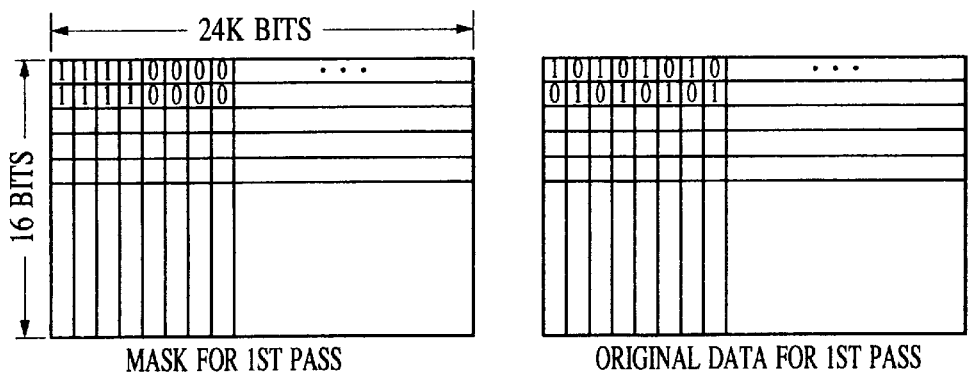
Figure 5D:
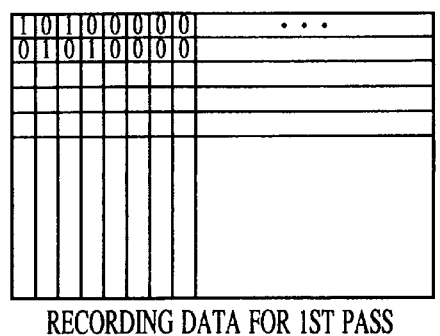

Because the recording is effected in this embodiment with resolution of 1200 DPI in the main scan direction and 600 DPI in the sub-scan direction, as stated above, each of the created random masks is enlarged four times in the main scan direction and two times in the sub-scan direction as shown in FIG. 5C. Recording data for each pass is produced by computing the logical AND of the enlarged mask data and the actual image data as shown in FIG. 5D. Accordingly, the produced image data having been masked reflects the frequency of a pattern of the random mask.

It is needless to say that while the method of creating the random masks for the 4-pass recording has been explained in the above embodiments, random masks for the 2-, 8- and 16-pass recording can also be created in a like manner. In the case of the 2-pass recording, for example, the random masks for two passes are created by dividing each value read out of the random number array of FIG. 5A by 2 to determine a residual, and setting bit values in accordance with whether the residual is "0" or "1".

Figure 6:
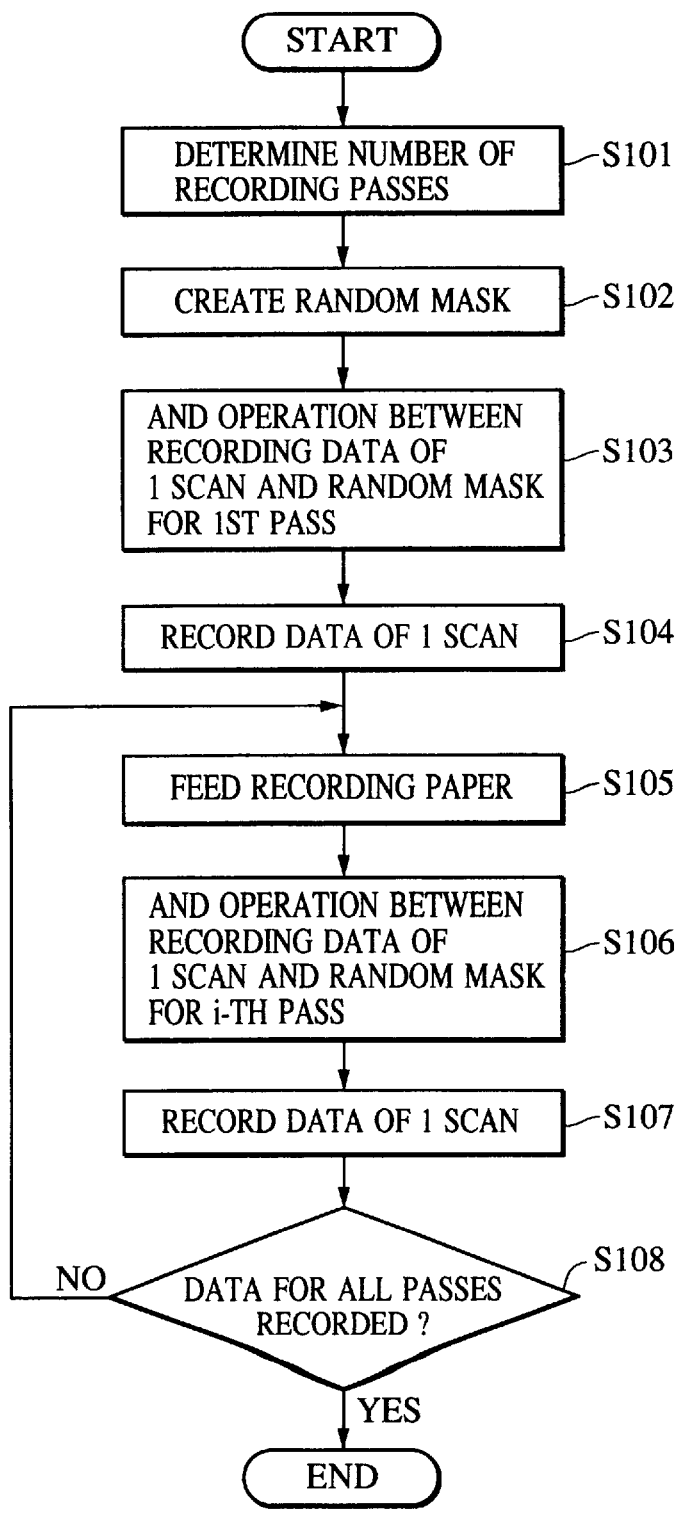
FIG. 6 is a flowchart showing a recording control process in multi-pass recording.

A recording control process in the multi-pass recording using the random masks created as explained above will now be described with reference to a flowchart shown in FIG. 6.

First, in step S101, the number of recording passes (e.g., 4) is determined in accordance with a command sent from the host 1000. Subsequently, in step S102, random masks are created corresponding to the number of recording passes, and the created random masks are enlarged four times in the main scan direction and two times in the sub-scan direction depending on the recording resolution, as stated above.

Then, in step S103, the MPU 401 develops image data received through the interface 400 into bit map data with the recording resolution of 1200×600 DPI, stores the bit map data temporarily in the predetermined area of the DRAM 403, and executes the logical AND operation between the bit map data and the random masks for the first-pass recording. On the assumption that the data developed into the bit map form has a size of 10 Kbits in the main scan direction and a size of 256 bits in the sub-scan direction, since the random mask of 6 Kbits×8 bits is enlarged four times in the main scan direction and two times in the sub-scan direction, each random mask is repeatedly used from the head per 16 lines in the sub-scan direction and at a rate of 0.42 time (=10 K÷24 K) per scan in the main scan direction.

In step S104, the data resulted from the AND operation in step S103 is transferred to the recording head to perform recording for the first pass. At this time, the recording is executed by transferring the masked image data for the lower-quarter 64 nozzles of the recording head. Subsequently, in step S105, the sheet of recording paper 107 is fed through a distance corresponding to the recording width of the 64 nozzles in the sub-scan direction. Simultaneously, to match the feeding of the sheet of recording paper 107, the data developed into the bit map form is also fed through an area corresponding to 64 rasters.

In step S106, the image data is masked by using the random mask for use in the recording of the next pass in a like manner to the above step S103. Then, in step S107, the recording of the i-th pass is performed by using the resulting masked image data. Note that the same random mask as used for the first pass is employed in the recording for the fifth pass. In these recording steps, during a process after the fourth pass counted from the first pass and before the fourth pass counted from the last pass, the recording is executed by transferring the masked image data corresponding to all the 256 nozzles of the recording head 201. In the recording of other passes, the number of used nozzles is gradually increased or decreased in units of a quarter (=64), and the masked image data corresponding to the number of used nozzles is transferred to the recording head. It is checked in step S108 whether the recording of all the passes is completed or not. If the recording of all the passes is not yet completed in step S108, then the process returns to step S105. If it is determined in step S108 that the recording of all the passes is completed, then the process is ended.

In the embodiment explained above, the multi-pass recording is carried out by creating random masks each having lower resolution (e.g., 300×300 DPI) than the relatively high recording resolution (e.g., 1200×600 DPI), and masking image data with the high resolution by using the created random masks. Stated otherwise, since the same mask is employed for each area of 4×2 dots, there occurs no variation in ejection of the ink droplets within that area. Therefore, high-frequency variations in ejection of the ink droplets, which are attributable to the ejection characteristic of the recording head and the accuracy of mechanical control such as carriage control and feed control of the recording medium, can be converted into low-frequency variations which are less perceivable by human eyes. As a result, unevenness in density, streaks and texture possibly occurred in a recorded image can be suppressed remarkably.

While the above embodiment has been described as applying the present invention to the recording apparatus, the present invention is also applicable to a print driver implemented on the host computer. In this case, image data having been thinned through the above-explained process is supplied for each pass from the host computer to the recording apparatus.

Second Embodiment

A second embodiment described below employs random masks adapted for the case wherein multi-pass recording is made by receiving multi-value data representing gradation of three or more levels for each pixel, and ejecting two or more ink droplets for the same pixel in accordance with the received multi-value data.

It is assumed as basic conditions of the following example that the recording apparatus receives from the host 1000 image data having information of 9-level gradations for each of pixels expressed with resolution of 300 DPI, and the number of passes in the multi-pass recording is 4.

Figure 7:
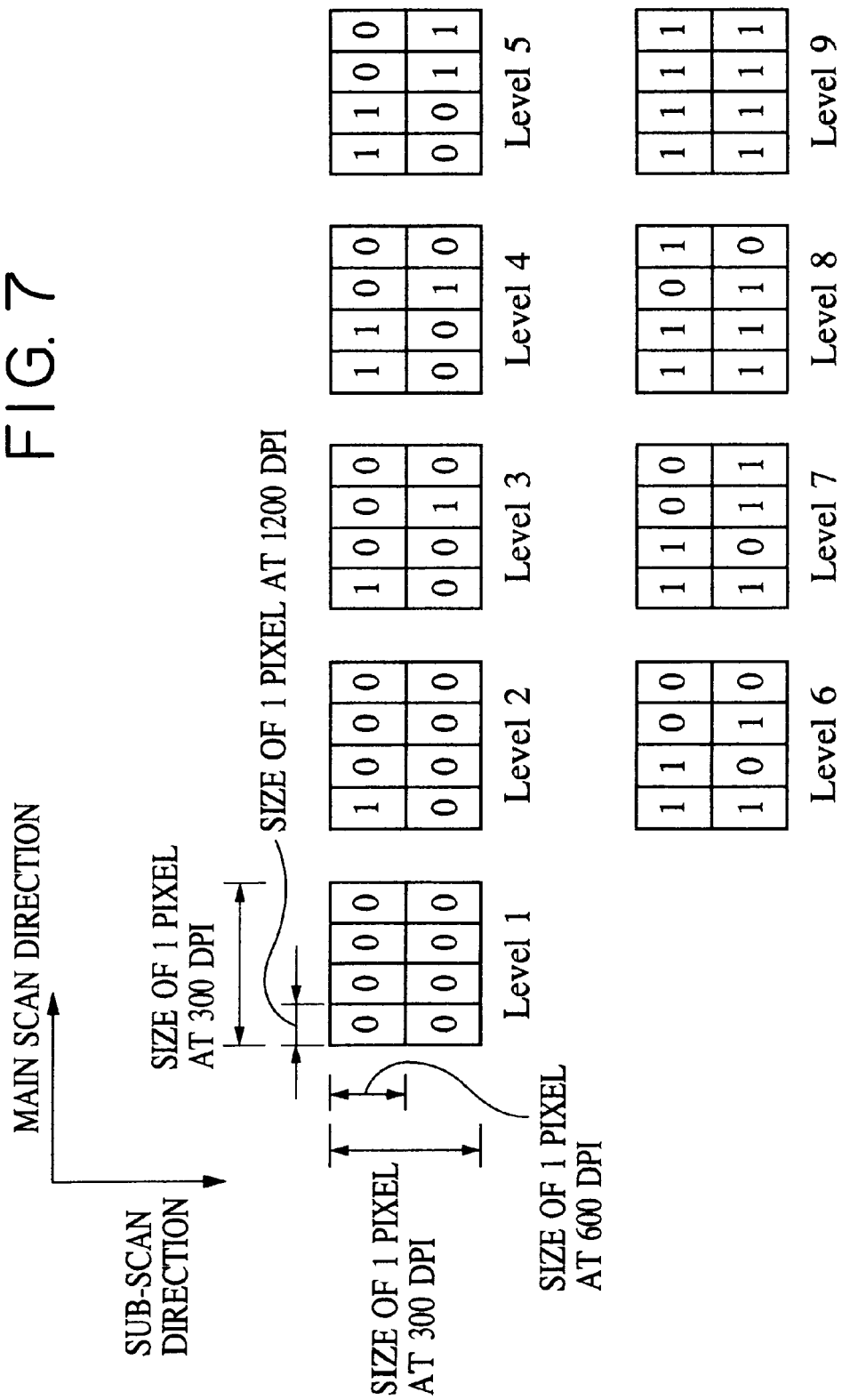
FIG. 7 is a representation schematically showing the structure of image data transferred from a host and having information of 9-level gradations.

FIG. 7 is a representation schematically showing the structure of image data transferred from the host 1000 and having information of 9-level gradations.

The host 1000 inherently produces multi-value data of 256 gradations which expresses one pixel with eight bits (0–255). When transmitting the multi-value data to the recording apparatus, as shown in FIG. 7, the host collects image data of 1 bit, corresponding to the recording resolution (1200 (in the main scan direction)×600 (in the sub-scan direction) DPI) of the recording apparatus, four in the main scan direction and two in the sub-scan direction to construct a matrix of 4×2 dots, and produces gradation information with the resolution of 300 DPI by using each matrix. Note that the number of dot placements (i.e., a mask-on rate) within the matrix of 4×2 dots is set beforehand in units of 2×1 dots (corresponding to 600×600 DPI).

Since one matrix is expressed by eight bits, each matrix can be quantized so as to express one of 9-level gradations from Level 1 to Level 9 depending on the combination of the eight bits which take a value of "0" or "1", as shown in FIG. 7.

Figure 8:
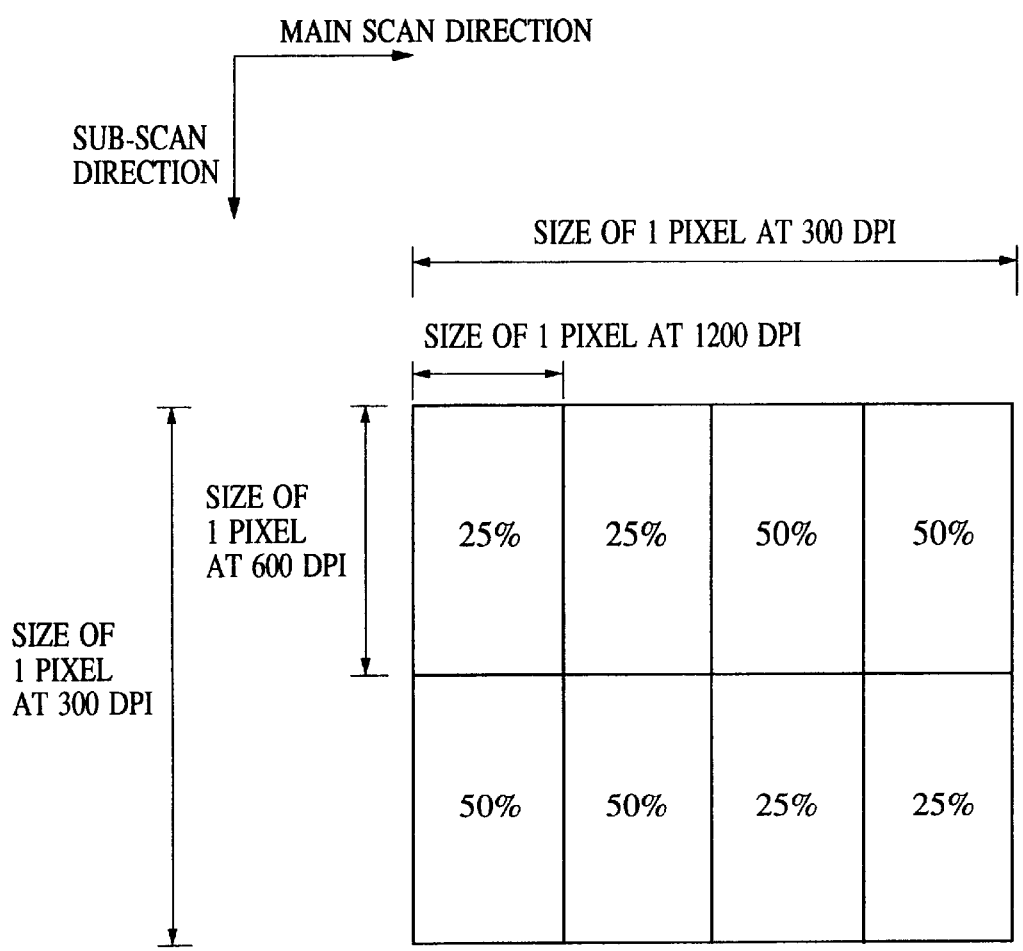
FIG. 8 is a representation indicative of masking probabilities of image data transferred from the host and having resolution of 300 DPI.

FIG. 8 is a representation indicative of masking probabilities of image data transferred from the host 1000 and having resolution of 300 DPI.

As stated above, the recording apparatus can perform recording with resolution of 1200 (in the main scan direction)×600 (in the sub-scan direction) DPI, and hence each of pixels with the recording resolution of 300 DPI is expressed by the pixel matrix as shown in FIG. 8. On the other hand, since the recording apparatus operates based on the 4-pass recording mode in this example, there are four opportunities at maximum that the ink ejection is made by the recording head 201 for each pixel.

In this example, therefore, random masks are created so that the ink is ejected at such probabilities as shown in FIG. 8 for each of pixels expressed with the resolution of 1200 (in the main scan direction)×600 (in the sub-scan direction) DPI.

In FIG. 8, "25%" means that the ink is ejected once at maximum per four scans, and "50%" means that the ink is ejected twice at maximum per four scans. Though not shown in FIG. 8, "75%" and "100%" means that the ink is ejected three or four times, respectively, at maximum per four scans.

The number of ink ejections for each pixel matrix is set to 0, 1, 2, 3, 4, 5, 7, 9 and 12 respectively for Level 1 to Level 9 given as the information of 9-level gradations, shown in FIG. 7, transferred from the host 1000.

Specifically, the number of ink ejections for the pixel matrix is provided by multiplying the value of each of the pixels expressed with the resolution of 1200 (in the main scan direction)×600 (in the sub-scan direction) DPI, and summing up the resulting products for all the pixels of the pixel matrix. In the case of Level 9, for example, the ink is ejected twice for each of two upper right pixels and two lower left pixels of the pixel matrix.

As a result of the above masking process, maximum twelve ink droplets can be ejected for the pixel matrix of 4×2 dots, and therefore the dynamic range of density capable of being expressed by the recording apparatus is increased. Thus, in the range of high density, an increase in density corresponding to an increase in the number of ink ejections would be otherwise suppressed, but the ink can be ejected in larger number through the above masking process.

It is a matter of course that the quantization of multi-value data applied from the host 1000 to the recording apparatus and the masking rate of the image data processed in the recording apparatus are not limited to those employed in the above embodiment, and the number of gradations of the quantized data and the masking rate may be changed to other values than in the above example depending on, e.g., the ability and characteristics of the host and the recording apparatus.

A method of creating random masks in this second embodiment will now be described.

FIGS. 9A to 9D are representations for explaining the method of creating random masks based on the masking probabilities shown in FIG. 8. Here, the random masks are created by using the random number array of 4-bit×48 K produced in the first embodiment.

Taking into account that the masking probability is maximum 50% in the 4-pass recording, two dots are potentially ejected for one of the pixels expressed with the resolution of 1200 (in the main scan direction)×600 (in the sub-scan direction) DPI in any of combinations of (1) first pass and second pass, (2) first pass and third pass, (3) first pass and fourth pass, (4) second pass and third pass, (5) second pass and fourth pass, and (6) third pass and fourth pass. Therefore, numeral values 0, 1, 2, 3, 4 and 5 are allocated to those combinations in one-to-one relation.

Figures 9A, 9B, 9C, 9D:
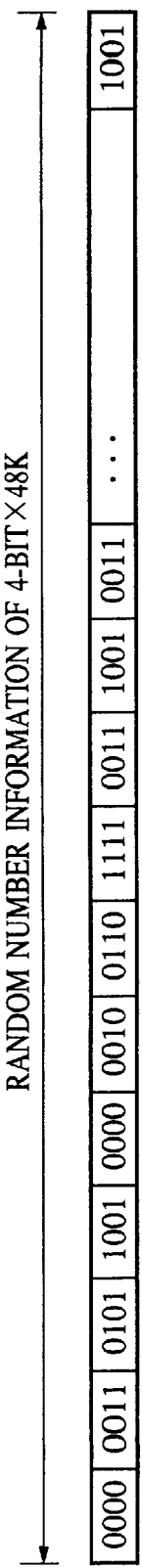
FIGS. 9A to 9D are representations for explaining a method of creating random masks based on the masking probabilities, shown in FIG. 8, according to a second example.

For the pixels of 50% mask-on rate, the random number array of 4-bit×48 K, shown in FIG. 9A, is read out from the head in units of 4-bits. Then, the residual resulted from dividing the read-out value by 6 is determined as shown in FIG. 9B. The residual is one of 0, 1, 2, 3, 4 and 5. The random masks are created in accordance with the residual.

More specifically, as shown in FIG. 9B, if the residual is "0", bits of the 4×2 matrix are turned on (set to "1") so that the positions corresponding to "50 %" in the 4×2 matrix for each of the first pass and the second pass reflect values of the image data. Likewise, if the residual is "1", the bits are turned on so that the positions corresponding to "50%" in the 4×2 matrix for each of the first pass and the third pass reflect values of the image data. If the residual is "2", the bits are turned on so that the positions corresponding to "50%" in the 4×2 matrix for each of the first pass and the fourth pass reflect values of the image data. If the residual is "3", the bits are turned on so that the positions corresponding to "50%" in the 4×2 matrix for each of the second pass and the third pass reflect values of the image data. If the residual is "4", the bits are turned on so that the positions corresponding to "50%" in the 4×2 matrix for each of the second pass and the fourth pass reflect values of the image data. If the residual is "5", the bits are turned on so that the positions corresponding to "50%" in the 4×2 matrix for each of the third pass and the fourth pass reflect values of the image data. Here, the dots of 50% mask-on rate within the pixel of 300 DPI (4×2 dots) are recorded with the same pass.

For example, if the residual is "0", the values of bits in the positions corresponding to "50%" in masks for the first pass and the second pass, i.e., upper-right quarter (two) bits and lower-left quarter (two) bits of the 4×2 pixel matrixes, are set to "1" as shown in FIG. 9D.

Then, for the pixels of 25% mask-on rate, the readout value from the random number array is divided by 4 to determine the residual. The residual is one of 0, 1, 2 and 3 as shown in FIG. 9C. For example, if the residual is "0", the values of bits in the positions corresponding to "25%" in the mask for the first pass, i.e., upper-left quarter (two) bits and lower-right quarter (two) bits of the 4×2 pixel matrix, are set to "1" as shown in FIGS. 9C and 9D. Here, the dots of 25% mask-on rate within the pixel of 300 DPI (4×2 dots) are also recorded with the same pass. The thus-resulting elements of the pixel matrix correspond to the recording resolution of 1200 DPI in the main scan direction and 600 DPI in the sub-scan direction. Note that for the third pass and the fourth pass, "1" is set not at all and therefore mask patterns for setting the values of all bits of the 4×2 pixel matrix to "0" are created.

If the residual resulted by dividing the read-out value by 6 is one of "1" to "5" and the residual resulted by dividing the read-out value by 4 is one of "1" to "3", mask patterns are created likewise in units of 4×2 pixel matrix.

Subsequently, the next four bits are read out from the random number array of 4-bit×48 K and mask patterns are created in a like manner to the above.

By executing the above-explained process similarly for the entire random number array of 4-bit×48 K, the random masks for four passes are completed which are each a combination of 4 (in the main scan direction)×2 (in the sub-scan direction) dots corresponding to the recording resolution of the recording apparatus and are adapted to achieve a 9-level multi-value representation.

In the actual recording operation, the logical AND of the image data, having the structure shown in FIG. 7, transferred from the host 1000 and each of the created random masks is computed, and the 4-pass recording is executed by using the masked image data.

Accordingly, considering the construction of the pixel matrix shown in FIG. 9D, i.e., considering the dots of 25% mask-on rate and the dots of 50% mask-on rate separately from each other, the masking process is essentially performed on the image data of 1200×600 DPI by using the random masks of 600×600 DPI. In other words, the same mask is used for an area of 2×1 dots; hence there occur no variations in ejection of ink droplets within that area.

Figure 10:
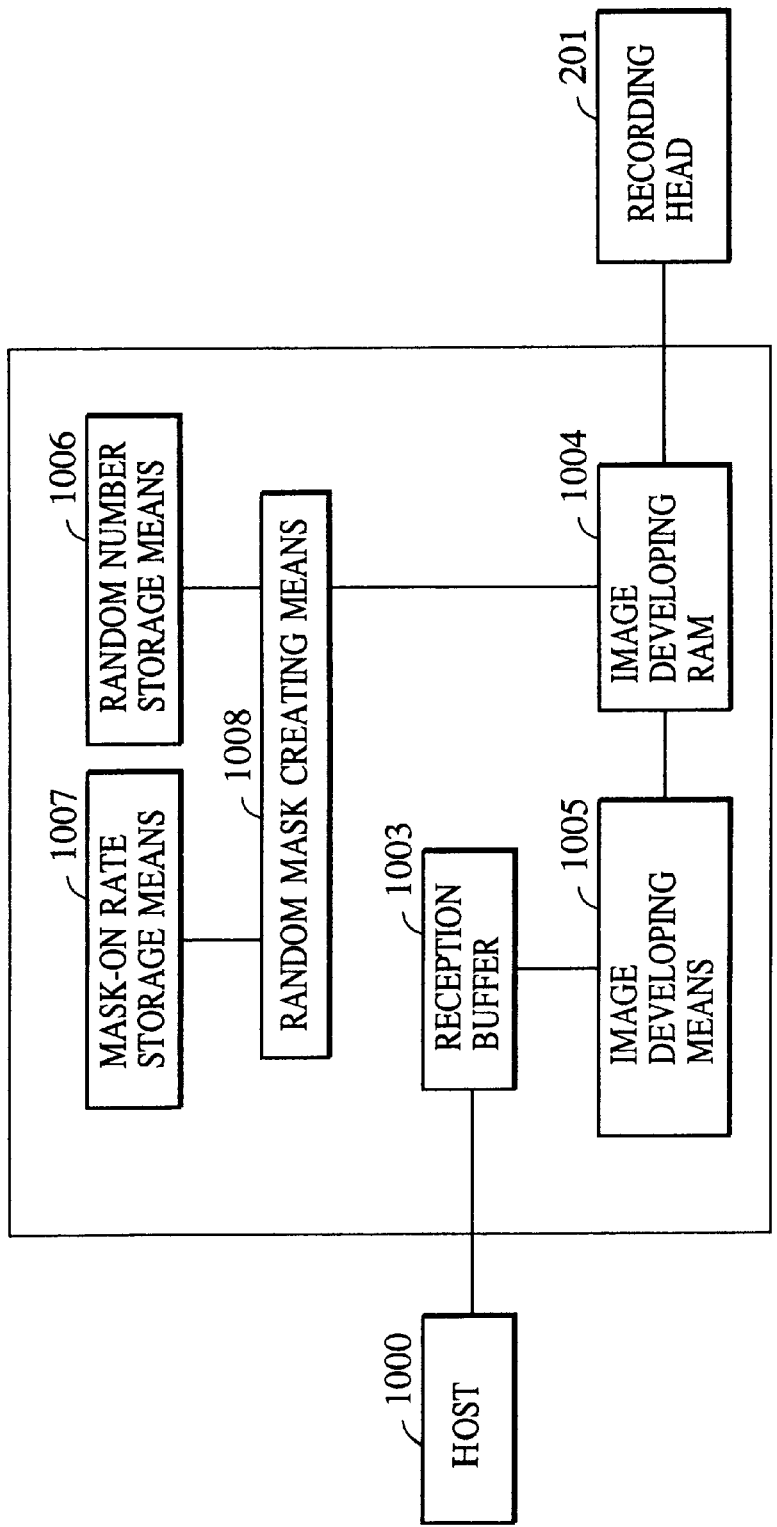
FIG. 10 is a functional block diagram showing a recording apparatus according to the second example.

The above-stated process for creating the random masks is executed by using the MPU 401, the random number generator 1001, the DRAM 403 and the EEPROM 1002 as with the first embodiment. FIG. 10 is a functional block diagram of an ink jet recording apparatus for achieving the process for creating the random masks. In FIG. 10, the ink jet recording apparatus of this second embodiment is made up of a reception buffer 1003 for receiving data with predetermined resolution from the host 1000, image developing/processing means 1005 for developing the data in the reception buffer into data for an image developing RAM 1004 and converting the received data into recording data capable of being recorded by the recording head 201, random number storage means 1006 for storing a random number array in predetermined number of bits, mask-on rate storage means 1007 for creating random masks corresponding to the number of recording passes from the random number array, making bold (enlarging) the amount of data to absorb a difference in resolution between the recording data and the random masks, and storing the number of dot placements (=a mask-on rate) set for each of pixels in the random masks, and random mask creating means 1008 for carrying out a masking process on the recording data.

While the method of creating random masks has been explained above for the case of 4-pass recording, the random masks for the cases of 2-, 8- and 16-pass recording can also be created in like manner.

According to this second embodiment explained above, since the masking process is performed by using the random masks each having resolution of 600×600 DPI lower than the recording resolution of 1200×600 DPI used for gradation representation, it is possible to suppress the occurrence of unevenness in density, streaks and texture which would be otherwise caused by variations in ejection ability of the recording head and the mechanical accuracy of the recording apparatus, and hence to achieve recording with high quality. Further, in the recording apparatus which receives three or more multi-value data and ejects the ink two or more times for the same pixel, the multi-pass recording enables the dynamic range of density for gradation representation to be increased.

Third Embodiment

A third embodiment described below is adapted for a masking process used in multi-pass recording wherein the carriage scan speed is sped up twice the normal speed that is in synch with the driving frequency of the recording head to improve a throughput without increasing the driving frequency of the recording head. It is assumed as basic conditions of this third embodiment that the recording apparatus performs multi-pass recording in which image recording is completed by four passes, image data with resolution of 1200×600 DPI is transferred from the host 1000, and the recording resolution per scan (1-pass recording) is essentially 600×600 DPI.

In recording control according to this third embodiment, therefore, the image data is thinned every other pixel in the main scan direction by using a random mask, and the image data omitted by the thinning are recorded in the other pass. The random mask is created based on the above concept.

This embodiment creates one random mask which enables recording to be effected for only the pixels corresponding to odd columns counted from a certain reference point in the main scan direction in the first and third passes of the 4-pass recording, and the other random mask which enables recording to be effected for only the pixels corresponding to even columns in the second and fourth passes of the 4-pass recording. By so creating the random masks, an image is formed by recording in a combination of (1) first pass (odd columns) and the second pass (even columns), (2) first pass (odd columns) and the fourth pass (even columns), (3) second pass (even columns) and the third pass (odd columns), and (4) third pass (odd columns) and the fourth pass (even columns).

FIGS. 11A to 11C are representations for explaining a method of creating the random masks in practice. As with the first example, it is also here assumed that the random number array of 4-bit×48 K produced in the first embodiment is used to create the random masks.

Which two of the four passes are to be used for recording is determined by using the random number array. In other words, the random number array is employed to determine in which one of the first and third passes the odd columns are recorded, and in which one of the second and fourth passes the even columns are recorded.

First, the random number array of 4-bit×48 K, shown in FIG. 11A, is read out from the head in units of 4-bit. Then, the residual resulted from dividing the read-out value by 4 is determined. The residual is one of 0, 1, 2 and 3, as shown in FIG. 11B. Which two passes are used to effect the recording is determined in accordance with the residual, as shown in FIG. 11C. For example, if the residual is "0", the odd columns are recorded in the first pass and the even columns are recorded in the second pass.

More specifically, mask patterns of the random masks are created in units of 4×2 pixel matrix. As shown in FIG. 11C, if the residual is "0", a 4×2 pixel matrix which serves as a mask pattern for the first pass is formed by setting a value of "1" to each of the odd columns in the main scan direction and setting a value of "0" to each of the even columns, and a 4×2 pixel matrix which serves as a mask pattern for the second pass is formed by setting a value of "1" to each of the even columns in the main scan direction and setting a value of "0" to each of the odd columns. On the other hand, all elements of 4×2 pixel matrixes which serves as mask patterns for the third and fourth passes are set to a value of "0".

Subsequently, if the residual is any of 1, 2 and 3, respective mask patterns are determined in units of 4×2 pixel matrix likewise.

Then, the next four bits are read out from the random number array of 4-bit×48 K and mask patterns for those four bits are created in a similar manner as explained above.

By executing the above-explained process likewise for the entire random number array of 4-bit×48 K, the random masks for four passes to be employed to effect the recording with recording resolution of essentially 600×600 DPI per scan are completed. The use of the random masks enables different nozzles to be driven in units of ⅟₁₂₀₀ inch in the main scan direction, and also enables dots to be controlled on/off in units of ⅟₃₀₀ inch in the sub-scan direction. Accordingly, the random masks each have resolution of 1200×300 DPI that is lower than the recording resolution of 1200×600 DPI.

In the actual recording operation, the logical AND of the image data transferred from the host 1000 and each of the created random masks is computed, and the 4-pass recording is executed by using the masked image data. In the 4-pass recording, the carriage scan speed is sped up twice the normal speed that is in synch with the driving frequency of the recording head. Since the image data is thinned every even or odd column in the main scan direction (i.e., in the carriage moving direction), the driving frequency is kept virtually the same although the carriage scan speed is sped up twice; hence no troubles occur in the image forming. Considering the construction of the pixel matrix shown in FIG. 11C, therefore, the image recording is essentially performed through the masking process performed on the image data of 1200×600 DPI by using the random masks with the resolution of 600×600 DPI.

The above-stated process for creating the random masks is executed by using the MPU 401, the random number generator 1001, the DRAM 403 and the EEPROM 1002 as with the first and third examples.

While the method of creating random masks has been explained above for the case of 4-pass recording, the random masks for the cases of 2-, 8- and 16-pass recording can also be created in a like manner.

According to this third embodiment explained above, image data is recorded while the pixels corresponding to particular columns in the main scan speed are subjected to thinning, by using the random masks which are created not to generate a high-frequency pattern. Even when the carriage scan speed is sped up twice the normal speed that is in synch with the driving frequency of the recording head, therefore, it is possible to remarkably suppress the occurrence of unevenness in density, streaks and texture which would be otherwise caused in a recorded image, and hence to achieve recording with high quality, while improving a throughput.

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements (pixels) and the high resolution of the recording are possible.

The typical structure and the operational principle of such devices are preferably the ones disclosed in U.S. Pat. Nos. 4,723,129 and 4,740,796. The principle and structures are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a. pulse, because development and contraction of the bubble can be effected instantaneously, and therefore the liquid (ink) is ejected with quick response. The driving signal in the form of a pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Unexamined Patent Publication No. 59-123670 wherein a common slit is used as the ejection outlet for plural electrothermal transducers, and to the structure disclosed in Japanese Unexamined Patent Publication No. 59-138461 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. Examples of such means include a capping means for the recording head, cleaning means therefor, pressing or sucking means, preliminary heating means which may be the electrothermal transducer, an additional hating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment and examples, the ink has been liquid. It also may be ink material which is solid below the room temperature but liquid at room temperature. Since the ink is kept within a temperature range between 30° C. and 70° C., in order to stabilize the viscosity of the ink to provide the stabilized ejection in the usual recording apparatus of this type, the ink may be such that it is liquid within the above temperature range when the recording signal is applied. The present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, in response to the application of the recording signal producing thermal energy, the ink is liquefied, and the liquefied ink may be ejected. Another ink material may start to be solidified at the time when it reaches the recording material.

The present invention is also applicable to such an ink material as is liquefied by the application of the thermal energy. Such an ink material may be retained as a liquid or solid material in through holes or recesses formed in a porous sheet as disclosed in Japanese Unexamined Patent Publication No. 54-56847 and Japanese Unexamined Patent Publication No. 60-71260. The sheet is faced to the electrothermal transducers. The most effective one of the techniques described above is the film boiling system.

The ink jet recording apparatus may be used as an output terminal of an information processing apparatus such as a computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

It is needless to say that the object of the present invention can also be achieved by supplying, to a system or apparatus, a storage medium which stores program codes of software for realizing the function of any of the above-described embodiment and examples, and causing a computer (or CPU and MPU) in the system or apparatus to read and execute the program codes stored in the storage medium.

In such a case, the program codes read out of the storage medium serve in themselves to realize the function of any of the above-described embodiment and examples, and hence the storage medium storing the program codes constitutes the present invention.

Storage mediums for use in supplying the program codes may be, e.g., floppy disks, hard disks, optical disks, photomagnetic disks, CD-ROM's, CD-R's, magnetic tapes, non-volatile memory cards, and ROM's.

Also, it is a matter of course that the function of any of the above-described embodiments and examples is realized by not only a computer reading and executing the program codes, but also an OS (Operating System) or the like which is working on the computer and executes part or whole of the actual process to realize the function. Thus, the latter case is naturally involved in the concept of the present invention.

Further, it is a matter of course that the present invention involves such a case where the program codes read out of the storage medium are written into a memory built in a function extension board mounted in the computer or a function extension unit connected to the computer, and a CPU incorporated in the function extension board or unit executes part or whole of theactual process in accordance with instructions from the program codes, thereby realizing the function of any of the above-described embodiment and the examples.

According to the present invention, as described above, since the masking process is performed by creating a mask which has such a lower resolution as making unevenness in density less perceivable by the human eyes, unevenness in density appears only at low frequency where it is relatively hard for the human eyes to recognize the unevenness in density, even when the so-called multi-pass recording is carried out with resolution higher than the resolution of the mask.

This results in an advantage that, in recording with high resolution, an image can be recorded with high quality free from unevenness in density, streaks and texture which are perceivable by the human eyes.

While particular embodiments of the invention have been shown and described, various modifications will be apparent to those skilled in the art. Therefore, it is not intended that the invention be limited to the disclosed embodiments or to the details thereof and departures may be made therefrom within the spirit and scope of the invention.

What is claimed is:

1. A recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising:

reception means for receiving data, developing means for developing multi-value image data received by said reception means into gradation Patterns;

random number generating means for generating a random number;

mask creating means for creating, based on the random number generated by said random number generating means, mask patterns each having a resolution lower than a recording resolution in at least one of the main scan direction and the sub-scan direction corresponding to the plural main scans; and thinning means for producing said thinned images to be recorded in the plural main scans by using the mask patterns created by said mask creating means;

wherein said thinning means produces said thinned images from the gradation patterns developed by said developing means and the mask patterns created by said mask creating means.

2. The recording apparatus according to claim 1, wherein said mask creating means includes rate setting means for setting a mask-on rate in each of areas resulting from dividing said mask pattern by the recording resolution, and means for creating a mask pattern which has mask-on rates corresponding to the mask-on rates set by said rate setting means.

3. The recording apparatus according to claim 1, wherein said mask creating means creates a mask pattern for thinning every odd or even pixel of an image in the main scan direction.

4. The recording apparatus according to claim 3, further comprising control means for controlling a main scan speed of said recording head including means for doubling the main scan speed.

5. The recording apparatus according to claim 1, wherein said mask creating means creates a mask pattern for effecting recording once by the plural main scans in a same pixel position of said recording medium.

6. The recording apparatus according to claim 1, wherein said mask creating means creates a mask pattern for effecting recording at least once by the plural main scans in a same pixel position of said recording medium.

7. The recording apparatus according to claim 1, wherein the multi-value image data received by said reception means has a resolution lower than the recording resolution.

8. The recording apparatus according to claim 1, wherein said random number generating means includes storage means in which arbitrary numeral values each in a predetermined number of bits are arrayed at random.

9. The recording apparatus according to claim 1, wherein the recording elements of said recording head eject ink.

10. The recording apparatus according to claim 1, wherein the recording elements of said recording head eject ink by thermal energy.

11. A recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising:

reception means for receiving data:

developing means for developing multi-value image data received by said reception means into gradation patterns;

random number generating means for generating a random number;

mask creating means for creating mask patterns each having a resolution equal to a recording resolution based on the random number generated by said random number generating means;

mask enlarging means for enlarging each of the mask patterns created by said mask creating means in at least one of the main scan direction and the sub-scan direction; and thinning means for producing said thinned images by using the mask patterns enlarged by said mask enlarging means, wherein said thinning means produces said thinned images from the gradation patterns developed by said developing means and the mask patterns created by said mask creating means and enlarged by said enlarging means.

12. A recording method by which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising the steps of:

receiving multi-valued data;

developing received multi-value image data into gradation patterns;

generating a random number, creating, based on the generated random number, mask patterns each having a resolution lower than a recording resolution in at least one of the main scan direction and the sub-scan direction corresponding to the plural main scans; and producing said thinned images to be recorded in the plural main scans using the created mask patterns;

wherein said thinning step produces said thinned images from the gradation patterns developed by said developing step and the mask patterns created by said mask creating step.

13. The recording method according to claim 12, wherein said mask creating step sets a mask-on rate in each of areas resulting from dividing said mask pattern by the recording resolution, and creates a mask pattern which has mask-on rates corresponding to the set mask-on rates.

14. The recording method according to claim 12, wherein said mask creating step creates a mask pattern for thinning every odd or even pixel of an image in the main scan direction.

15. The recording method according to claim 12, wherein said mask creating step creates a mask pattern for effecting recording once by the plural main scans in a same pixel position of said recording medium.

16. The recording method according to claim 12, wherein said mask creating step creates a mask pattern for effecting recording at least once by the plural main scans in a same pixel position of said recording medium.

17. The recording method according to claim 12, wherein the multi-value image data received by said receiving step has a resolution lower than the recording resolution.

18. A data supply method for supplying image data to a recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising the steps of:

receiving multi-valued data;

developing received multi-value image data into gradation patterns;

generating a random number;

creating, based on the generated random number, mask patterns each having a resolution lower than a recording resolution in at least one of the main scan direction and the sub-scan direction corresponding to the plural main scans; and producing said thinned images to be recorded in the plural main scans using the created mask patterns, wherein said thinning step produces said thinned images from the gradation patterns developed by said developing step and the mask patterns created by said mask creating step.

19. A recording method by which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising the steps of:

receiving multi-valued data;

developing received multi-value image data into gradation patterns;

generating a random number;

creating mask patterns each having a resolution equal to a recording resolution based on the generated random number;

enlarging each of the created mask patterns in at least one of the main scan direction and the sub-scan direction ; and producing said thinned images using the enlarged mask patterns wherein said thinning step produces said thinned images from the gradation patterns developed by said developing step and the mask patterns created by said mask creating step and enlarged in the enlarging step.

20. A data supply method for supplying image data to a recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising the steps of:

receiving multi-valued data;

developing received multi-value image data into gradation patterns;

generating a random number;

creating mask patterns each having a resolution equal to a recording resolution based on the generated random number;

enlarging each of the created mask patterns in at least one of the main scan direction and the sub-scan direction; and producing said thinned images using the enlarged mask patterns, wherein said thinning step Produces said thinned images from the gradation patterns developed by said developing step and the mask patterns created by said mask creating step and enlarged in the enlarging step.

21. A recording apparatus in which a recording head having a plurality of recording elements is main-scanned plural times, with at least one sub-scan interposed between the main scans, over a predetermined area of a recording medium to record a thinned image for each scan in a complementary manner, thereby forming a whole image on said recording medium, comprising:

random number generating means for generating a random number;

mask creating means for creating, based on the random number generated by said random number generating means, mask patterns each having a resolution lower than a recording resolution in the sub-scan direction corresponding to the plural main scans, each mask pattern for thinning every odd or even pixel of an image in the main scan direction; and thinning means for producing said thinned images to be recorded in the plural main scans by using the mask patterns for thinning every odd or even pixel created by said mask creating means.

22. A recording apparatus according to claim 21, wherein each mask pattern thins every odd or even column of an image in the main scan direction.

23. A recording apparatus according to claim 21, further comprising:

scanning means for scanning the recording head in the main scan direction, wherein the scanning speed of said scanning means is twice the normal speed that is in synch with the driving frequency of the recording head.

24. A recording apparatus according to claim 21, further comprising:

reception means for receiving data;

developing means for developing multi-value image data received by said reception means into gradation patterns, wherein said thinning means produces said thinned images from the gradation patterns developed by said developing means and the mask patterns created by said mask creating means.

* * * * *

UNITED STATES PATENT AND TRADEMARK OFFICE
CERTIFICATE OF CORRECTION

PATENT NO. : 6,183,055 B1
DATED : February 6, 2001
INVENTOR(S) : Daigoro Kanematsu et al.

It is certified that error appears in the above-identified patent and that said Letters Patent is hereby corrected as shown below:

Title page,
Item [56] References Cited, U.S. PATENT DOCUMENTS,
Insert -- 4,313,124  1/1982  Hara. --

Column 5,
Line 12, "embodiment" should read -- embodiments --;
Line 49, "examples/of" should read -- examples of --.

Column 6,
Line 4, "to" should read -- to as --.

Column 7,
Line 14, "able" should read -- to be able --.

Column 8,
Line 5, "not:" should read -- not --.

Column 9,
Line 23, "24+4=6" should read -- 24÷4=6 --.

Column 10,
Line 36, "K+24K)" should read -- K÷24K) --.

Column 11,
Line 15, "occurred" should read -- occurring --.

Column 13,
Line 23, "readout" should read -- read-out --.

Column 15,
Line 35, "serves" should read -- serve --.

Column 16,
Line 48, "a." should read -- a --.

Column 17,
Line 16, "hating" should read -- heating --.

UNITED STATES PATENT AND TRADEMARK OFFICE
CERTIFICATE OF CORRECTION

PATENT NO. : 6,183,055 B1
DATED : February 6, 2001
INVENTOR(S) : Daigoro Kanematsu et al.

It is certified that error appears in the above-identified patent and that said Letters Patent is hereby corrected as shown below:

Column 18,
Line 9, "embodiment" should read -- embodiments --;
Line 28, "theactual" should read -- the actual --;
Line 30, "embodiment" should read -- embodiments --;
Line 61, "Pat-" should read -pat- --.

Column 20,
Line 16, "multi-valued" should read -- multi-value --;
Line 19, "number," should read -- number; --;
Line 27, "patterns;" should read -- patterns, --;
Line 60, "multi-valued" should read -- multi-value --.

Column 21,
Line 16, "multi-valued" should read -- multi-value --.
Line 25, "direction ;" should read -- direction; --;
Line 28, "patterns" should read -- patterns, --;
Line 41, "multi-valued" should read -- multi-value --.

Column 22,
Line 3, "Produces" should read -- produces --.

Signed and Sealed this

Fifth Day of March, 2002

Attest:

*Attesting Officer*

JAMES E. ROGAN
*Director of the United States Patent and Trademark Office*